United States Patent
Chopra et al.

(10) Patent No.: US 11,500,738 B2
(45) Date of Patent: *Nov. 15, 2022

(54) TAGGING APPLICATION RESOURCES FOR SNAPSHOT CAPABILITY-AWARE DISCOVERY

(71) Applicant: EMC IP Holding Company LLC, Hopkinton, MA (US)

(72) Inventors: Shelesh Chopra, Bangalore (IN); Pawan Singh, Bangalore (IN); Yasemin Ugur-Ozekinci, Oakville (CA); Jayashree Radha, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 173 days.

This patent is subject to a terminal disclaimer.

(21) Appl. No.: 16/830,701

(22) Filed: Mar. 26, 2020

(65) Prior Publication Data

US 2021/0303413 A1    Sep. 30, 2021

(51) Int. Cl.
*G06F 16/00* (2019.01)
*G06F 11/14* (2006.01)
*G06F 16/23* (2019.01)
*G06F 16/11* (2019.01)

(52) U.S. Cl.
CPC ...... *G06F 11/1464* (2013.01); *G06F 11/1435* (2013.01); *G06F 11/1451* (2013.01); *G06F 11/1461* (2013.01); *G06F 11/1469* (2013.01); *G06F 16/128* (2019.01); *G06F 16/2322* (2019.01); *G06F 2201/84* (2013.01)

(58) Field of Classification Search
CPC ............ G06F 16/2322; G06F 11/1451; G06F 2201/84; G06F 11/1464; G06F 11/1469; G06F 11/1461; G06F 16/128; G06F 11/1435
See application file for complete search history.

(56) References Cited

U.S. PATENT DOCUMENTS

| | | | |
|---|---|---|---|
| 8,996,566 B2* | 3/2015 | Haustein | G06F 16/1873 707/769 |
| 10,169,164 B1* | 1/2019 | Chopra | G06F 11/1451 |
| 2013/0173548 A1* | 7/2013 | Haustein | G06F 16/1873 707/638 |
| 2016/0253241 A1* | 9/2016 | Gupta | G06F 16/182 707/654 |
| 2017/0134487 A1* | 5/2017 | Karandikar | H04L 67/325 |
| 2018/0285203 A1* | 10/2018 | Cox | G06F 11/1464 |
| 2018/0336210 A1* | 11/2018 | Bourgeois | G06F 16/181 |
| 2020/0097309 A1* | 3/2020 | Chopra | G06F 9/4856 |

* cited by examiner

*Primary Examiner* — Shiow-Jy Fan
(74) *Attorney, Agent, or Firm* — Dergosits & Noah LLP; Todd A. Noah

(57) ABSTRACT

Tagging application resources for snapshot capability-aware discovery is described. If an application's host determines that one of an application's resource satisfies any snapshot capability rule, the application's host associates the application resource with a snapshot capable tag. The application's host outputs an identifier of the application resource and any associated snapshot capable tag to a backup server. The application's host inputs a request from the backup server to create a snapshot of the application resource associated with the snapshot capable tag and creates the snapshot of the application resource associated with the snapshot capable tag.

20 Claims, 4 Drawing Sheets

TAGGING APPLICATION RESOURCES FOR SNAPSHOT CAPABILITY-AWARE DISCOVERY

BACKGROUND

A data object can be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired time when the data object was in this state, and then instructs the backup/restore application to execute a restore operation to restore a copy of the corresponding backup file(s) for that state to the data object.

A backup/restore application can create a full backup file for a data object by backing up all of the data in the data object. A full backup file may be created at infrequent intervals and can serve as a reference point for subsequent differential backup files, incremental backup files, and/or transaction log backup files. A backup/restore application can create a differential backup file for a data object by backing up the data that has changed in the data object since the last full backup file was created for the data object. As the elapsed time increases since the most recent full backup file, the accumulated changes increase in a data object, as does the time to create a differential backup file. A backup/restore application can create an incremental backup file for a data object by backing up only data that is new or changed in the data object since the most recent previous backup file was created, which may have been a full backup file, a differential backup file, or another incremental backup file. Since an incremental backup file does not store duplicate copies of unchanged data, a system can efficiently store more backup files created at more points in time by organizing the data into increments of change between points in time. A backup/restore application can create a transaction log backup file for a data object by only backing up a history of actions executed by the data object's management system. The data object's management system can use a transaction log backup file to re-apply the changes made by committed transitions that are not materialized in a data object and roll back the changes to a data object that were made by uncommitted transactions.

A data object may be stored on a storage array, which can be a disk-based retention system that includes multiple disk drives. Unlike a disk enclosure, a storage array has cache memory and advanced functionality, such as virtualization and Redundant Array of Independent Disks (RAID). A data protection administrator can instruct a backup/restore application to create backups files of data objects and store the backup files of data objects on multiple storage arrays.

A backup/restore application can include an application data manager that requests application data management agents on application hosts to discover the application resources that are stored on these hosts, such as discovering the application host configurations (which may be referred to as application servers), the file systems, the applications, the databases, and the copy metadata of all backups on all application hosts. After discovering these application resources, the application data management agents can send copies of these application resources and information about these application resources to the requesting application data manager.

If system stores an application resource, such as a database, on a logical or virtual disk that was created on a storage area network, then a backup/restore application can protect the application resource by creating a snapshot of the logical disk that stores the application resource. A snapshot can be a record of the contents of a storage location or data file at a given time. If creating a snapshot of an application resource is possible, then a backup/restore application can use the Logical Unit Number (LUN) of the logical disk that stores the application resource to create a local snapshot of the application resource, and can move a copy of the local snapshot to a remote storage device for long term retention of the snapshot. If creating a snapshot of an application resource is not possible, then a backup/restore application can protect the application resource by creating copies of each data object in the application resource and storing these copies of data objects as a backup file on a remote storage device for long term retention.

DETAILED DESCRIPTION

A typical backup/restore application cannot determine whether creating a snapshot of an application resource is possible. Even if creating a snapshot of an application resource is possible, the creation of a single snapshot may be less efficient than creating multiple copies of multiple data objects in the application resource. For example, unless a database is a large database that has a large footprint, creating a snapshot of the database may be less efficient than creating multiple copies of multiple data objects in the database. Therefore, requiring data protection administrators to intervene manually and determine whether to create a snapshot of an application resource may result in a delay in the protection of the application resource, errors in determining whether to create a snapshot of the application resource, and/or a snapshot that is created less efficiently than the creation of multiple copies of multiple data objects in the application resource.

Embodiments herein provide tagging application resources for snapshot capability-aware discovery. If an application's host determines that one of an application's resource satisfies any snapshot capability rule, the application's host associates the application resource with a snapshot capable tag. The application's host outputs an identifier of the application resource and any associated snapshot capable tag to a backup server. The application's host inputs a request from the backup server to create a snapshot of the application resource associated with the snapshot capable tag, and then creates the snapshot of the application resource associated with the snapshot capable tag.

For example, an application host determines whether any of a SQL application's resources satisfies any of the snapshot capability rules, such as a rule that requires 100 giga-byte of storage for any SQL application resource to be snapshot capable. Since the SQL database satisfies the snapshot capability rule for SQL application resources by storing 110 giga-bytes of data on a virtual disk, the application host tags the SQL database with a snapshot capable tag. The application host provides an identifier of the SQL database and the snapshot capable tag to a backup server, which requests the application host to apply a SQL data protection policy for creating hourly snapshots to the SQL database. The application host responds to the request by using the LUN of the virtual disk to create hourly snapshots of the SQL database.

Figure 1:
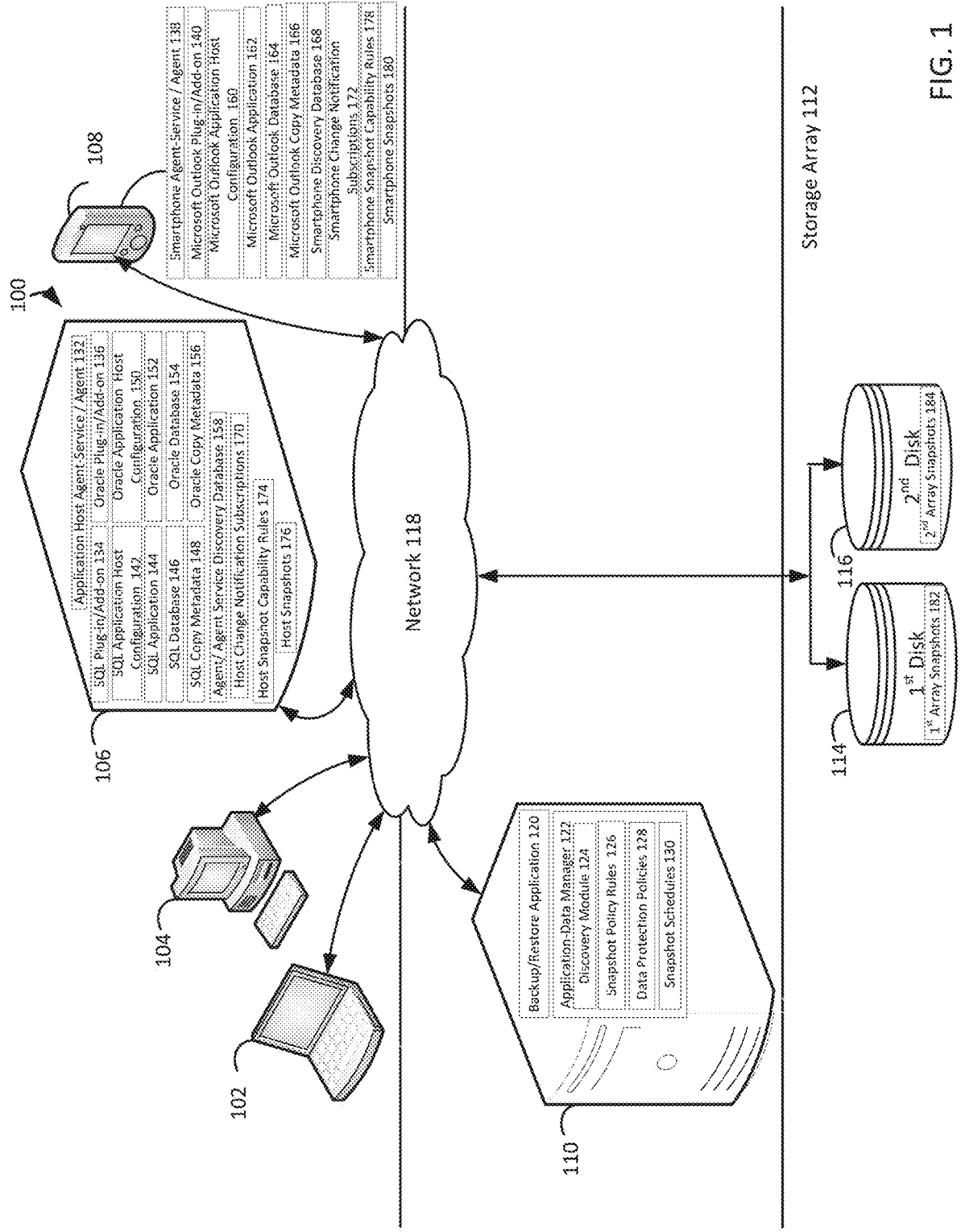
FIG. 1 illustrates a block diagram of an example system for tagging application resources for snapshot capability-aware discovery and snapshot capability-aware discovery of tagged application resource, under an embodiment.

FIG. 1 illustrates a diagram of a system 100 for tagging application resources for snapshot capability-aware discovery and snapshot capability-aware discovery of tagged application resources, under an embodiment. As shown in FIG. 1, the system 100 may illustrate a cloud computing environment in which data, applications, services, and other application resources are stored and delivered through shared data centers and appear as a single point of access for the users. The system 100 may also represent any other type of distributed computer network environment in which servers control the storage and distribution of application resources and services for different client users.

In an embodiment, the system 100 represents a cloud computing system that includes a first client 102, a second client 104, a third client 106, and a fourth client 108; and a server 110, and a storage array 112 that may be provided by a hosting company. Although FIG. 1 depicts the first client 102 as a laptop computer 102, the second client 104 as a personal computer 104, the third client 106 as an application host 106, and the fourth client 108 as a smartphone 108, each of the clients 102-108 may be any type of computer. The storage array 112 includes a first disk 114 and a second disk 116. The clients 102-108, the server 110, and the storage array 112 communicate via a network 118. Although FIG. 1 depicts the system 100 with four clients 102-108, one server 110, one storage array 112, two disks 114-116, and one network 118, the system 100 may include any number of clients 102-108, any number of servers 110, any number of storage arrays 112, any number of disks 114-116, and any number of networks 118. The clients 102-108 and the server 110 may each be substantially similar to the system 400 depicted in FIG. 4 and described below.

The server 110, which may be referred to as a backup server 110, includes a backup/restore application 120 that can create backup files of data objects for the clients 102-108, and execute a restore based on the backup files stored on the storage array 112. The backup/restore application 120 can provide centralized administration, such as scheduling, monitoring, and managing backup operations and backup files. The backup/restore application 120 can enable the storing of backup operation schedules, client policies, and client configurations. The backup/restore application 120 can provide a unique interface to the clients 102-108 during login, and also assist the backup server 110 in authenticating and registering the clients 102-108. The backup/restore application 120 can send backup/restore work orders to the clients 102-108, which can receive and process the work orders to start a backup or restore operation. The backup/restore application 120 can maintain a local database of all processes that execute on the backup server 110. The backup/restore application 120 can execute server-side processes for a system administrator's graphical management console, which may enable the system administrator to use command line interface tools for queries. For example, a system administrator identifies the clients 102-108 registered with the backup server 110.

The backup server 110 also includes an application data manager 122, which includes a discovery module 124, snapshot policy rules 126, data protection policies 128, and snapshot schedules 130. As described below, the backup/restore application 120 can use the application data manager 122 to backup data objects and restore data objects, and use the discovery module 124 to request for clients to discover data for their application resources and request clients to provide change notifications for their application resources. As also described below, the application data manager 122 can use the snapshot policy rules 126 to determine which of the data protection policies 128 apply to application resources that are tagged with snapshot capable tags, and then create snapshots of these application resources according to any of the snapshot schedules 130 that correspond to the applicable data protection policies 128. FIG. 1 depicts the backup/restore application 120 and the application data manager 122 residing completely on the backup server 110, but the backup/restore application 120 and/or the application data manager 122 may reside in any combination of partially on the backup server 110, partially on another server which is not depicted in FIG. 1, and partially on the clients 102-108.

Using a generic data model and discovery protocol, the application data manager 122 can discover data for application resources via an application host agent-service which can generically use an add-on to discover data for different application resources on the clients 102-108. Alternatively, using application vendor-specific logic, the application data manager 122 can discover data for application resources via an application host agent which can use a vendor-specific plug-in to discover data for different application resources and their backup copies on the clients 102-108. Therefore, the application data manager 122 can discover data for application resources via an application host agent-service or agent 132 which can use a SQL Plug-in or Add-on 134 and an Oracle Plug-in or Add-on 136 to discover data for the application resources on the application host 106, and discover data for application resources via a smartphone agent-service or agent 138 which can use a Microsoft Outlook Plug-in or Add-on 140 to discover data for the application resources on the smartphone 108.

In an example using the generic data model, after registering the application host 106, the application data manager 122 can discover data for application resources on the application host 106 via the application host agent-service 132 which can use the SQL add-on 134 to discover data for a SQL application host configuration 142, a SQL application 144, a SQL database 146, and SQL copy metadata 148. In another example using the generic data model, after registering the application host 106, the application data manager 122 can discover data for application resources on the application host 106 via the application host agent-service 132 which can use the Oracle add-on 136 to discover data for an Oracle application host configuration 150, an Oracle application 152, an Oracle database 154, and Oracle copy metadata 156. The application host agent-service 132 may store its discovered data in an agent service discovery database 158. In yet another example using the generic data model, after registering the smartphone 108, the application data manager 122 can discover data for application resources on the smartphone 108 via the smartphone agent-service 138 which can use the Microsoft® Outlook add-on 140 to discover data for a Microsoft® Outlook application host configuration 160, a Microsoft® Outlook application 162, a Microsoft® Outlook database 164, and Microsoft® Outlook copy metadata 166, and store the discovered data in a smartphone discovery database 168.

In an example using the application vendor-specific logic, after registering the application host 106, the application data manager 122 can discover data for the application resources on the application host 106 via the application host agent 132 which can use the SQL Plug-in 134 to discover data for the SQL application host configuration 142, the SQL application 144, the SQL database 146, and the SQL copy metadata 148. In another example using the application vendor-specific logic, after registering the application host 106, the application data manager 122 can discover data for application resources on the application host 106 via the application host agent 132 which can use the Oracle Plug-in 136 to discover data for the Oracle application host configuration 150, the Oracle application 152, the Oracle database 154, and the Oracle copy metadata 156. The application host agent 132 may store its discovered data in an agent discovery database 158. In yet another example using the application vendor-specific logic, after registering the smartphone 108, the application data manager 122 can discover data for application resources on the smartphone 108 via the smartphone agent 138 which can use the Microsoft® Outlook Plug-in 140 to discover data for the Microsoft® Outlook application host configuration 160, the Microsoft® Outlook application 162, the Microsoft® Outlook database 164, and the Microsoft® Outlook copy metadata 166, and store the discovered data in the smartphone discovery database 168. In some embodiments, the discovery module 124 can use one component for discovering application resources other than copies of metadata, such as the databases 146, 154, and 164, and use another component dedicated to discovering copies of metadata, such as the copy metadata 148, 156, and 166.

As described below, the application host agent-service or agent 132 may store subscriptions by the application data manager 122 to change notifications for the application resources 142-148 and 150-156 with updated timestamps in host change notification subscriptions 170, while the smartphone agent-service or agent 138 may store subscriptions by the application data manager 122 to change notifications for the application resources 160-166 with updated timestamps in smartphone change notification subscriptions 172. FIG. 1 depicts the system 100 with four clients 102-108 that communicate via two agent-services or agents 132 and 138 which use three Add-ons or Plug-ins 134, 136, and 140 to discover data for twelve application resources 142-156 and 160-166 for three applications 144, 152, and 162, store discovered data in two discovery databases 158 and 168, and store subscriptions for change notification in two sets of change notification subscriptions 170 and 172. However, the system 100 may include any number of clients 102-108 that communicate via any number of agent-services or agents 132 and 138 which use any number of Add-ons or Plug-ins 134, 136, and 140 to discover data for any number of application resources 142-156, and 160-166 for any number of applications 144, 152, and 162, store discovered data in any number of discovery databases 158 and 168, and store subscriptions for change notification in any number of sets of change notification subscriptions 170 and 172.

As described below, the application host agent-service or agent 132 may apply host snapshot capability rules 174 to the application resources 142-156 to enable the backup server 110 to determine whether to create host snapshots 176, while the smartphone agent-service or agent 138 may apply smartphone snapshot capability rules 178 to the application resources 160-166 to enable the backup server 110 to determine whether to create smartphone snapshots 180. As also described below the system 100 can move the host snapshots 176 and the smartphone snapshots 180 to the $1^{st}$ array snapshots 182 and the $2^{nd}$ array snapshots 184. The host snapshots 176 and the smartphone snapshots 180 may be referred to as short-term snapshots 176 and 180, while the $1^{st}$ disk snapshots 182 and the $2^{nd}$ disk snapshots 184 may be referred to as long-term snapshots 182 and 184. Although FIG. 1 depicts the system 100 with two sets of snapshot capability rules 174 and 178 and four sets of snapshots 176 and 180-184, the system 100 may include any number of sets of snapshot capability rules 174 and 178 and any number of sets of snapshots 176 and 180-184.

Although the following paragraphs describe Dell Corporation's PowerProtect® backup/restore application, Dell Corporation's NetWorker® backup/restore application, and Dell Corporation's Avamar® backup/restore application as examples of the backup/restore application 120, the backup/restore application 120 may be any other type of backup/restore application which provides the backup/restore functionalities described in the Background section. The backup server 110 may be any other type of backup server which provides the backup/restore functionalities described in the Background section.

The backup/restore application 120 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances. When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 120 may be an Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 120 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic. Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types. The storage array 112 may be a Dell Corporation's Powermax, a Dell Corporation XIO, or a Dell Corporation Unity storage array.

Before, during, and/or after discovery of existing and/or new application resources, an application host determines if each existing and/or new application resource satisfies at least one of a set of snapshot capability rules. The set of snapshot capability rules may include a first snapshot capability rule and/or a second snapshot capability rule, and the application resource may be required to satisfy the first snapshot capability rule and/or the second snapshot capability rule or both the first snapshot capability rule and the second snapshot capability rule. For example, the application host agent-services 132 determines whether any of the SQL application resources 142-148 satisfies any of the host snapshot capability rules 174, such as a compound rule that needs satisfaction by both a first rule which requires the vendor of an application resource to be SQL and a second rule which requires an application resource to have a storage requirement of more than 100 giga-bytes. The application host agent-services 132 dynamically determines whether any of the SQL application resources 142-148 satisfies any of the host snapshot capability rules 174 at runtime. For example, today the SQL database 146 satisfies the storage requirement of more than 100 giga-bytes by storing 110 giga-bytes of data on a virtual disk, whereas yesterday the SQL database 146 failed to satisfy the storage requirement of more than 100 giga-bytes by storing only 99 giga-bytes of data on the virtual disk. In another example, the application host agent-services 132 determines whether any of the Oracle application resources 150-156 satisfies any of the host snapshot capability rules 174, such as a compound rule that requires satisfaction by either a first rule which requires the vendor of an application resource to be Oracle or a second rule which requires an application resource to have a storage requirement of more than 100 giga-bytes. In yet another example, the application host agent-services 132 determines whether any of the Microsoft® Outlook application resources 160-166 satisfies any of the host snapshot capability rules 174, such as a rule which requires the vendor of an application resource to be Microsoft® Outlook.

An application host can be a computer that executes a computer program that performs a particular task or set of tasks. An application can be a computer program that performs a particular task or set of tasks. An application resource can be an asset used by a program that executes a particular task or set of tasks. A snapshot capability rule can be a prerequisite for the possibility of creating a record of the contents of a storage location or data file at a given time. A set can be a group of entities.

The set of snapshot capability rules may specify a size of storage that stores the application resource, a type of storage that stores the application resource, a computing resource utilization associated with the application host, a communication rate associated with the application host, a changed part of the application resource relative to an unchanged part of the application resource; a name associated with the application host, an internet protocol range associated with the application host, and a vendor associated with the application. For example, the host snapshot capability rules 174 require that an application resource be stored on VMAX storage, be stored on VPLEX storage, be executed by an application host with less than 20% memory used, be executed by an application host with an I/O rate that is greater than 1,000 per second, be executed by an application host that has a name which includes "high I/O," be executed by an application host with an internet protocol address within the range 128.1.0.1 to 191.255.255.254, and/or be changed by more than 10%, A size of storage can be the magnitude for the retention of retrievable data on a computer, other electronic system, or memory. A type of storage can be a category for the retention of retrievable data on a computer, other electronic system, or memory. A computing resource utilization can be the effective use of an electronic asset for executing a program that performs a particular task or set of tasks. A communication rate can be a frequency of exchanging information. A changed part can be a modified portion of an entity. An unchanged part can be an unmodified portion of an entity. A name can be an identifier. An internet protocol address range can be the area of variation between upper and lower limits of a numerical label assigned to each device connected to a computer network. A vendor can be a supplier of a product or service.

If an application resource satisfies a snapshot capability rule, an application host tags the rule-satisfying application resource with a snapshot capable tag. For example, the application host agent-services 132 tags the SQL database 146 with a snapshot capable tag because the SQL database 146 stores 110 giga-bytes of data on a virtual disk, and a snapshot capability rule requires a SQL application resource to store at least 100 giga-bytes on a virtual disk to qualify as being snapshot capable. In another example, the application host agent-services 132 tags the SQL application 144 with a snapshot capable tag because the SQL application 144 stores 120 giga-bytes of data on a virtual disk, which satisfies the snapshot capability rule for SQL application resources. In yet another example, the application host agent-services 132 does not tag either the SQL application host configuration 142 or the SQL copy metadata 148 with a snapshot capable tag because neither the SQL application host configuration 142 nor the SQL copy metadata 148 stores more than 100 giga-bytes of data on a virtual disk, as required by the snapshot capability rule for SQL application resources. A snapshot capable tag can be an identifier of the possibility of creating a record of the contents of a storage location or data file at a given time.

A backup server outputs a discovery request for an application's resources to the application's host. For example, the backup server 110 executes the discovery module 124 in the application data manager 122, which requests the agent-services or agents 132 and 138 that are executing on the clients 106 and 108, which may be referred to as the application hosts 106 and 108, to discover their application resources. Examples of the application resources include the application host configurations 142, 150, and 160, the applications 144, 152, and 162, the databases 146, 154, and 164, the copy metadata 148, 156, and 166 of all backups in the clients 106 and 108, and any corresponding file systems. For example, the discovery module 124 makes REST (Representational State Transfer) application programming interface calls to request for the agent-services or agents 132 and 138 to discover their application resources.

A backup server can be a computer that executes computer programs which assist client devices in storing copies of data objects for retention within dedicated files. A discovery request can be a solicitation to identify application resources. An application host configuration can be a set-up of a computer that executes a computer program that performs a particular task or set of tasks. A database can be structured information stored in a computer. Copy metadata can be information about a backup of structured information stored in a computer. A file system can be an entity that organizes collections of computer data and programs.

In some embodiments, a backup server requesting the discovery of application resources results in an application host discovering all of its application resources, storing data for all of its application resources in a discovery database, and then providing change notifications for all of its application resources to the backup server. For example, after receiving a discovery request from the application data manager's discovery module 124, the agent-services or agents 132 and 138 respond by discovering the application resources 142-156 and 160-166 on the clients 106 and 108 and storing the data for the discovered application resources 142-156 and 160-166 in the discovery databases 158 and 168, which may be implemented as SQLite databases 158 and 168. If a discovered application resource is tagged with a snapshot capable tag, then agent-services or agents store an identifier of the snapshot capable application resource in a discovery database, but if the discovered application resource is not tagged with a snapshot capable tag, then the agent-services or agents store a copy of the application resource in a discovery databases. For example, the agent-services 132 stores identifiers of the SQL application 144 and the SQL database 146 in the discovery database 158 because the SQL application 144 and the SQL database 146 are tagged with snapshot capable tags, and stores copies of the SQL application host configuration 142 and the SQL copy metadata 148 in the discovery database 158 because the SQL host configuration 142 and the SQL copy metadata 148 are not tagged with any snapshot capable tags. Then the agent-services 132 sends change notifications for the SQL application host configuration 142, the SQL application 144, the SQL database 146, and the SQL copy metadata 148 to the discovery module 124. A change notification can be information about a discovery of an application resource. An identifier can be a sequence of characters used to refer to a program or an element, such as a variable or a set of data, within the program. A copy can be a duplicate of an entity.

In other embodiments, a discovery request includes a timestamp corresponding to a previous version of an application resource, such that inputting the discovery request creates a subscription from the backup server to receive a change notification for the application resource only when a current version of the application resource is discovered with an updated timestamp. For example, when requesting the discovery of application resources, the discovery module 124 sends the agent-services or agents 132 and 138 the previous timestamp for each application resource for which the discovery module 124 previously fetched a copy or created a snapshot. Upon receipt of these previous timestamps for each application resource for which copies were previously fetched or snapshots were previously created, the agent-services or agents 132 and 138 subscribe the discovery module 124 to receive a change notification for any discovered application resources that were added, modified, or deleted after their previous timestamp, and any discovered application resources which do not correspond to a previous timestamp. Consequently, the agent-services or agents 132 and 138 only inform the discovery module 124 about application resources which had not been previously discovered, rather than informing the discovery module 124 about the discovery of application resources for which the discovery module 124 has already fetched a copy or created a snapshot.

A timestamp can be a digital record of when a particular event occurred. An updated timestamp can be a revised digital record of when a particular event occurred. A previous version can be a particular form of something that differs in certain respects from a later form of the same type of thing. A current version can be a particular form of something that differs in certain respects from a previous form of the same type of thing. A subscription can be an arrangement to receive something.

If a backup server subscribes to receive a change notification when an application resource's timestamp is updated, the application host can respond to an updated timestamp for the application resource by outputting the change notification for the application resource to the backup server. The agent-services or agents can compare the previous timestamps for previously fetched copies of application resources and previously snapshotted application resources against the corresponding timestamps for each currently discovered application resource. Then the agent-services or agents can store only the data for the currently discovered application resources which were added, modified, or deleted after their previous timestamp or which did not correspond to a previous timestamp. For example, the application host agent-services 132 received the timestamp of one year ago for the previous copy of the SQL application host configuration 142, the timestamp of one year ago for the previous snapshot of the SQL application 144, the timestamp of one hour ago for the previous snapshot of the SQL database 146, and the timestamp of one hour ago for the previous copy of the SQL copy metadata 148 from the discovery module 124. The application host agent-services 132 discovers the SQL resources, 142-148, compares the previous timestamps received from the discovery module 124 to the timestamp of one year ago for the currently discovered SQL application host configuration 142, the timestamp of one year ago for the currently discovered SQL application 144, the timestamp of 1 minute ago for the currently discovered SQL database 146. and the timestamp of 1 minute ago for the currently discovered SQL copy metadata 148. If a discovered application resource is tagged with a snapshot capable tag, then agent-services or agents store an identifier of the snapshot capable application resource in a discovery database, but if the discovered application resource is not tagged with a snapshot capable tag, then the agent-services or agents store a copy of the application resource in a discovery databases. For example, the application host agent-service 132 stores an identifier of the currently discovered SQL database 146 and a copy of the currently discovered SQL copy metadata 148 in the SQLite databases 158, because the SQL database 146 and the SQL copy metadata 148 are discovered application resources that were added, modified, or deleted after their previous timestamp was received from the discovery module 124, and sends a change notification for the SQL database 146 and the SQL copy metadata 148 to the discovery module 124.

Alternatively, the agent-services or agents 132 and 138 independently discover the application resources 142-156 and 160-166 on the clients 106 and 108, without having received any discovery request from the application data manager's discovery module 124. In this way, the agent-services or agents 132 and 138 are resilient to transient issues, such as application data manager unavailability or an error on the network 118. If a discovered application resource is tagged with a snapshot capable tag, then agent-services or agents store an identifier of the snapshot capable application resource in a discovery database, but if the discovered application resource is not tagged with a snapshot capable tag, then the agent-services or agents store a copy of the application resource in a discovery databases. For example, the agent-services 132 stores identifiers of the SQL application 144 and the SQL database 146 in the discovery database 158 because the SQL application 144 and the SQL database 146 are tagged with snapshot capable tags, and stores copies of the SQL application host configuration 142 and the SQL copy metadata 148 in the discovery database 158 because the SQL host configuration 142 and the SQL copy metadata 148 are not tagged with any snapshot capable tags. Then the agent-services 132 sends change notifications for the SQL application host configuration 142, the SQL application 144, the SQL database 146, and the SQL copy metadata 148 to the discovery module 124.

Following receipt of a change notification for an application resource, a backup server can request an application host to provide information for a newly discovered application resource. For example, the discovery module 124 makes a REST application programming interface call to the application host agent-services 132 to request information about any newly discovered application resource, such as the SQL database 146. An application host can receive a request for information for a newly discovered application resource. For example, the application host agent-services 132 receives the REST application programming interface call from the discovery module 124 to request information about any newly discovered application resource, such as the SQL database 146. A request can be an instruction to a computer to provide information.

Having tagged any application resource that is snapshot capable, an application host outputs data for a discovered application resource and any associated snapshot capable tag. For example, the application host agent-services 132. makes a REST application programming interface call that provides an identifier of the SQL database 146 and its associated snapshot capable tag to the discovery module 124. A backup server inputs information for a discovered application resource and any associated snapshot capable tag. For example, the discovery module 124 receives the REST application programming interface call from the application host agent-services 132 that provides an identifier of the SQL database 146 and its associated snapshot capable tag.

In some embodiments, a backup server requesting the discovery of application resources results in an application host discovering all of its application resources and then providing copies of all of its application resources to the backup server for storage as backup files. For example, after receiving a discovery request from the application data manager's discovery module 124, the agent-services or agents 132 and 138 respond by discovering the application resources 142-156 and 160-166 on the clients 106 and 108 and then outputting copies or identifiers of the discovered application resources 142-156 and 160-166 to the discovery module 124. If a discovered application resource is tagged with a snapshot capable tag, then agent-services or agents output an identifier of the snapshot capable application resource to the backup server, but if the discovered application resource is not tagged with a snapshot capable tag, then the agent-services or agents output a copy of the application resource to the backup server. For example, the agent-services 132 outputs identifiers of the SQL application 144 and the SQL database 146 to the discovery module 124 because the SQL application 144 and the SQL database 146 are tagged with snapshot capable tags, and outputs copies of the SQL application host configuration 142 and the SQL copy metadata 148 to the discovery module 124 because the SQL host configuration 142 and the SQL copy metadata 148 are not tagged with any snapshot capable tags, A backup server inputs information for a discovered application resource and any associated snapshot capable tag. For example, the discovery module 124 receives the REST application programming interface call from the application host agent-services 132 that provides an identifier of the SQL database 146 and its associated snapshot capable tag. Having input an identifier of an application resource, a backup server determines whether any of the application resource identifiers which were input had been input with snapshot capable tags. For example, the application data manager 122 determines whether the identifier of the SQL database 146 was input with an associated snapshot capable tag. In some embodiments, the application data manager 122 can determine that the identifier of an application resource was input with a user-provided snapshot capable flag that enable the creation of a snapshot of the application resource. A system administrator may provide such a snapshot capable tag to create a snapshot of the application resource when the application resource may not satisfy any of the snapshot capability rules.

If the application resource identifier was input with any associated snapshot capable tag, then a backup server determines whether the snapshot capable application resource satisfies any snapshot policy rule. For example, the application data manager 122 determines whether the SQL database 146 satisfies any of the snapshot policy rules 126. If the application resource satisfies a snapshot policy rule, then a backup server identifies the data protection policy that corresponds to the snapshot policy rule satisfied by the application resource. For example, the application data manager 122 determines that the SQL database 146 satisfies one of the snapshot policy rules 126 that corresponds to a SQL data protection policy in the data protection policies 128, which requires hourly snapshots of the SQL database 146, and stores the hourly snapshot schedule for the SQL database 146 in the snapshot schedules 130. A snapshot policy rule can be a requirement for a plan to create a record of the contents of a storage location or data file at a given time. A data protection policy can be a plan to back up and/or restore information.

The snapshot policy rules 126 may include a first snapshot policy rule and a second snapshot policy rule. The application resource satisfying at least one of the snapshot policy rules 126 may include the application resource satisfying the first snapshot policy rule and/or the second snapshot policy rule, or the application resource satisfying both the first snapshot policy rule and the second snapshot policy rule. For example, the application data manager 122 determines whether the SQL database 146 satisfies any of the snapshot policy rules 126, such as a compound rule that needs satisfaction by both a first rule which requires the vendor of an application resource to be SQL and a second rule which requires an application resource to be a database. In another example, the application data manager 122 determines whether the Oracle database 154 satisfies any of the snapshot policy rules 126, such as a compound rule that requires satisfaction by either a first rule which requires the vendor of an application resource to be Oracle or a second rule which requires an application resource to be a cluster application rather than a standalone application. In yet another example, the application data manager 122 determines whether the Microsoft® Outlook database 164 satisfies any of the snapshot policy rules 126, such as a rule which requires the application host of an application resource to be a Microsoft® Windows host.

The snapshot policy rules 126 may specify a type of storage that stores the application resource, a type of the application resource, a type of the application host, a layout associated with the application host, and a vendor associated with the application. For example, the snapshot policy rules 126 specify different data protection policies based on whether an application resource is stored on a Dell storage array or a non-snapshot-able storage array. A type of an application resource can be a category of an asset used by a program that executes a particular task or set of tasks. A type of an application host can be a category of a computer that executes a computer program that performs a particular task or set of tasks. A layout associated with an application host can be a network arrangement for a computer that executes a computer program that performs a particular task or set of tasks.

The data protection policies 128 may include different policies for various data protection levels, such as a "gold" policy for VMware® clients, a "platinum" policy for UNIX® clients, and a "silver" policy for Windows® clients. The gold policy can specify to store 2 snapshots for each VMware® client's application resources onto the first disk 114 for 6 months, store a primary clone of the snapshots onto the second disk 116 for 1 year, and store a secondary clone of the snapshots onto a tape, which is not depicted in FIG. 1, for 5 years. A policy's start time specifies the start times for creating a snapshot of an application resource, such as 12:00, 13:00, 14:00, and 15:00, for an hourly snapshot, a policy's retention policy specifies the length of time that a snapshot is retained before the snapshot is destroyed, such as a year, and a policy's destination pool specifies the target storage device where snapshots are stored, such as the first disk 114 and the second disk 116. For example, the SQL database 146 satisfies a snapshot policy rule 126 that corresponds to one of the data protection policies 128, which specifies to create a hourly snapshot of an application resource as one of the host snapshots 176, create a copy of each hourly snapshot and store each copied snapshot as one of the $1^{st}$ disk snapshots 182, create a clone of each copied snapshot and store each cloned snapshot as one of the $2^{nd}$ disk snapshots 184, and delete each hourly snapshot from the host snapshots 176.

After a data protection policy is identified, a backup server requests an application host to create a snapshot of a snapshot-capable application resource based on the identified data protection policy. For example, the application data manager 122 makes a REST application programming interface call to the application host agent-services 132 to create a snapshot of the SQL database 146. An application host receives a request from a backup server to create a snapshot of a snapshot-capable application resource based on the identified data protection policy. For example, the application host agent-services 132 receives the REST application programming interface call from the application data manager 122 to create a snapshot of the SQL database 146. Having received a request to create a snapshot of an application resource, an application host creates the snapshot of a snapshot-capable application resource. For example, the application host agent-services 132 uses the LUN of the virtual disk that stores the SQL database 146 to create a snapshot of the SQL database 146.

Creating a snapshot of a storage device that stores a database may include quiescing the database before creating the snapshot of the storage device that stores the database and then un-quiescing the database after creating the snapshot of the storage device that stores the database. For example, the application host agent-services 132 puts the SQL database 146 in hot backup mode, uses the LUN of the virtual disk that stores the SQL database 146 to create a snapshot of the virtual disk that stores the SQL database 146, and then takes the SQL database 146 out of hot backup mode. Some databases need to be quiesced to ensure that sequence numbers are added to identify data being changed and the transaction logs that reflect these changes. Therefore, snapshots of a database and copies of transaction logs may be orchestrated to ensure that data being captured is application consistent and recoverable up to any point in time. For example, after creating the snapshot of the virtual disk that stores the SQL database 146 and taking the SQL database 146 out of hot backup mode, the application host agent-services 132 captures the Oracle redo log stream generated during the hot backup mode to the archived Oracle redo logs, and then creates a copy of the Oracle archived redo logs. In software applications that modify information stored on persistent storage, quiescing generally involves flushing any outstanding writes.

After an application host creates a snapshot of an application resource, a backup server can request the application host to move the short-term retention snapshot to the backup server for long-term retention. For example, the application data manager 122 makes a REST application programming interface call to the application host agent-services 132 to move the snapshot of the SQL database 146 from the host snapshots 176. Following receipt of a request to move a snapshot of an application resource, an application host can move a short-term retention snapshot to a backup server for long-term retention. For example, the application host agent-services 132 moves the snapshot of the SQL database 146 from the host snapshots 176 to the application data manager 122, which stores the snapshot of the SQL database 146 in the 1st disk snapshots 182. While the application host 106 has limited capacity for storing the short-term snapshots 176, the storage array 112 has capacity for storing the long-term snapshots 182 and 184 on a long-term basis. A backup/restore application can also store metadata for a database and its transaction logs in remote storage. For example, the storage array 112 stores the metadata for the SQL database snapshot, and the copy of the SQL redo logs.

Figure 2:
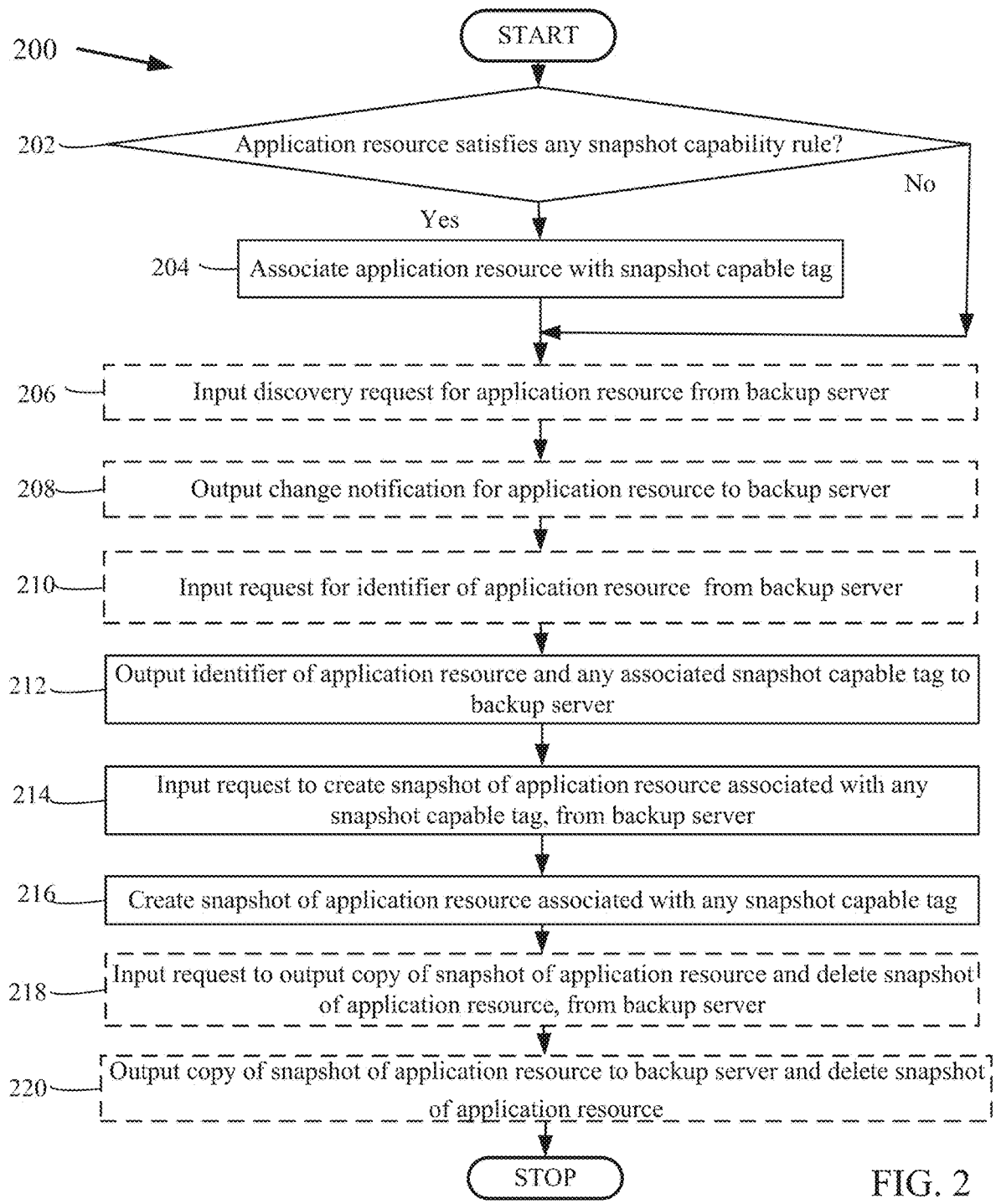
FIG. 2 is a flowchart that illustrates a method of tagging application resources for snapshot capability-aware discovery, under an embodiment.

FIG. 2 is a flowchart that illustrates a method for tagging application resources for snapshot capability-aware discovery, under an embodiment. Flowchart 200 illustrates method acts illustrated as flowchart blocks for certain steps involved in the clients 102-108 and/or between the clients 102-108 and the backup server 110 of FIG. 1.

A determination is made whether any of an application's resources satisfies any of the snapshot capability rules, block 202. An application host determines if an application resource satisfies a snapshot capability rule. For example, and without limitation, this can include the application host agent-services 132 determining whether any of the SQL application resources 142-148 satisfies a 100 giga-byte storage requirement for SQL application resources. If an application resource satisfies a snapshot capability rule, the method 200 continues to block 204 to tag the rule-satisfying application resource as snapshot capable. If an application resource does not satisfy a snapshot capability rule, the method 200 proceeds to block 206 to optionally input a discovery request.

If an application resource satisfies a snapshot capability rule, the application resource is associated with a snapshot capable tag, block 204. An application host tags a rule-satisfying application resource as snapshot capable. By way of example and without limitation, this can include the application host agent-services 132 tagging the SQL database 146 with a snapshot capable tag because the SQL database 146 stores 110 giga-bytes of data on a virtual disk, and a snapshot capability rule requires a SQL application resource to store at least 100 giga-bytes on a virtual disk to qualify as being snapshot capable.

After determining whether an application resource satisfies a snapshot capability rule, a discovery request associated with the application resource is optionally input from a backup server, block 206. An application host can receive a request from a backup server to discover an application resource. In embodiments, this can include the agent-services 132 and 138 receiving REST application programming interface calls from the discovery module 124 that request the discovery of their application resources. The discovery request may include timestamps for application resources, such as the timestamp of one year ago for the previous snapshot of the SQL application 144 and the timestamp of one hour ago for the previous snapshot of the SQL database 146. The agent-services 132 and 138 can use timestamps to create subscriptions for discovery module 124 to receive change notifications when the application host agent-services 132 discovers newer versions of application resources, such as the SQL application 144 and/or the SQL database 146.

Following the receipt of a discovery request, a change notification for an application resource is optionally output to the backup server, block 208. An application host can notify a backup server that an application resource has been discovered. For example, and without limitation, this can include the application host agent-services 132 making a REST application programming interface call to notify the discovery module 124 that the timestamp for the SQL database 146 has changed since the previous timestamp for the SQL database 146, which was received in a discovery request.

Having output a change notification for an application resource, a request is optionally input for an identifier of the application resource, block 210. An application host can receive a request for information for a newly discovered application resource. By way of example and without limitation, this can include the application host agent-services 132 receiving a REST application programming interface call from the discovery module 124 to request information about any newly discovered application resource, such as the SQL database 146.

After tagging any application resource that is snapshot capable, an identifier of an application resource and any associated snapshot capable tag is output to a backup server, block 212. An application host outputs information for a discovered application resource and any associated snapshot capable tag. In embodiments, this can include the application host agent-services 132. making a REST application programming interface call that provides an identifier of the SQL database 146 and its associated snapshot capable tag to the discovery module 124.

Following the output of the identifier of an application resource and an associated snapshot capable tag, a request is input from a backup server to create a snapshot of the application resource associated with the snapshot capable tag, block 214. An application host receives a request to create a snapshot of a snapshot-capable application resource. For example, and without limitation, this can include the application host agent-services 132 receiving a REST application programming interface call from the application data manager 122 to create a snapshot of the SQL database 146.

Having received a request to create a snapshot of an application resource, a snapshot is created of the application resource, block 216. An application host creates a snapshot of a snapshot-capable application resource. By way of example and without limitation, this can include the application host agent-services 132 using the LUN of the virtual disk that stores the SQL database 146 to create a snapshot of the SQL database 146.

After creating a snapshot of an application resource, a request is optionally input to output a copy of the snapshot of the application resource and delete the snapshot of the application resource, block 218. An application host can receive a request to move a short-term retention snapshot to a backup server for long-term retention. In embodiments, this can include the application host agent-services 132 receiving a REST application programming interface call from the application data manager 122 to move the snapshot of the SQL database 146 from the host snapshots 176.

Following receipt of a request to move a snapshot of an application resource, a copy of the snapshot of the application resource is optionally output and the snapshot of the application resource is optionally deleted, block 220. An application host can move a short-term retention snapshot to a backup server for long-term retention. For example, and without limitation, this can include the application host agent-services 132 moving the snapshot of the SQL database 146 from the host snapshots 176 to the application data manager 122.

Although FIG. 2 depicts the blocks 202-220 occurring in a specific order, the blocks 202-220 may occur in another order. In other implementations, each of the blocks 202-220 may also be executed in combination with other blocks and/or some blocks may be divided into a different set of blocks.

Figure 3:
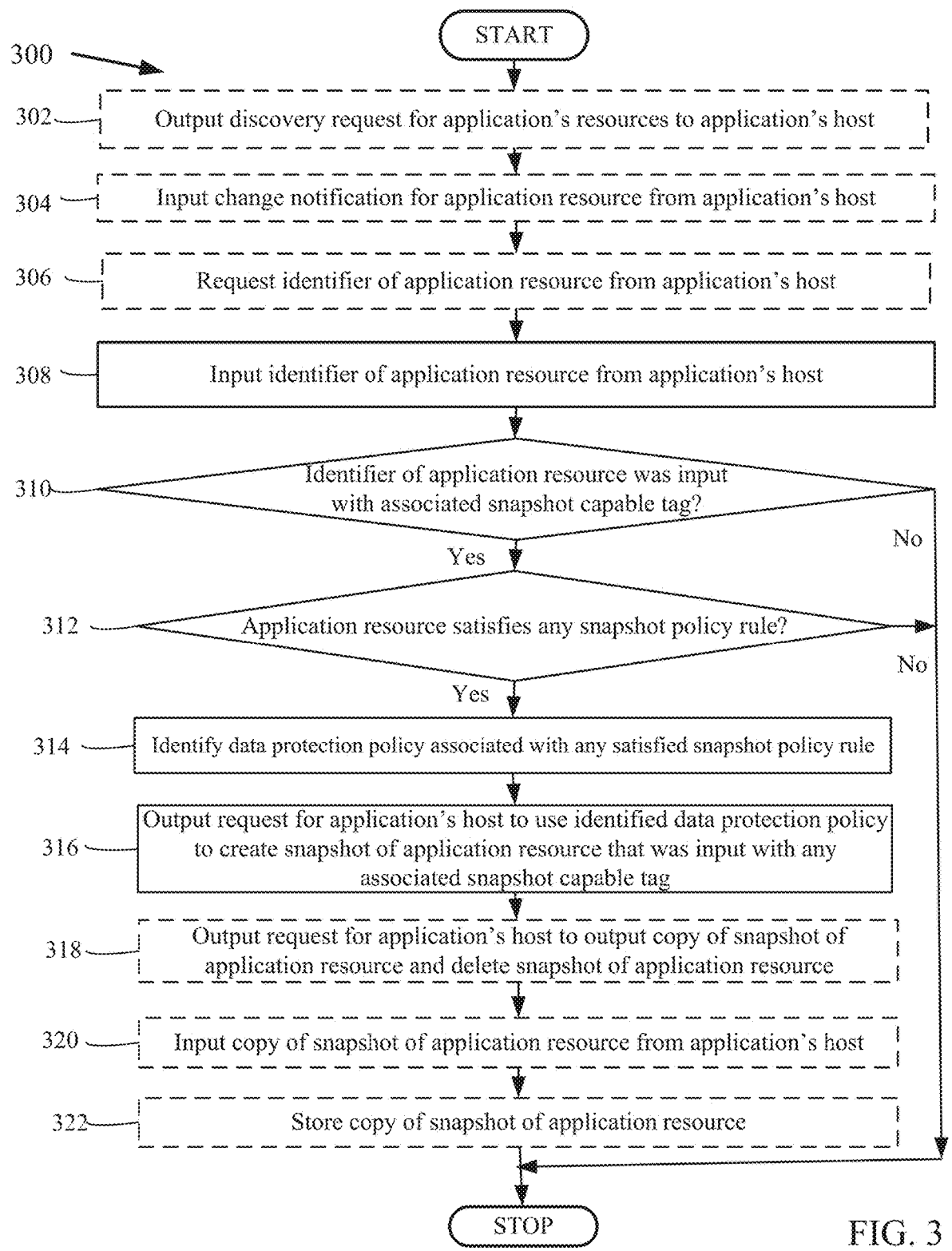
FIG. 3 is a flowchart that illustrates a method of snapshot capability-aware discovery of tagged application resources, under an embodiment.

FIG. 3 is a flowchart that illustrates a method for snapshot capability-aware discovery of tagged application resources, under an embodiment. Flowchart 300 illustrates method acts illustrated as flowchart blocks for certain steps involved in the backup server 110 and/or between the backup server 110 and the clients 102-108 of FIG. 1.

A discovery request for an application's resources is optionally output to the application's host, block 302. A backup server can request the discovery of an application host's resources. For example, and without limitation, this can include the discovery module 124 making REST application programming interface calls requests for the agent-services 132 and 138 to discover their client application resources. The discovery request may include timestamps for application resources, such as the timestamp of one year ago for the previous snapshot of the SQL application 144 and the timestamp of one hour ago for the previous snapshot of the SQL database 146. By including any timestamps in a discovery request the discovery module 124 subscribes to receive change notifications when the application host agent-services 132 discovers newer versions timestamps for the application resources, such as the SQL application 144 and/or the SQL database 146.

After requesting discovery of an application host's resources, a change notification for an application resource is optionally input from the application host, block 304. A backup server can be notified when an application host's resource has been discovered. By way of example and without limitation, this can include the discovery module 124 receiving a REST application programming interface call from the application host agent-services 132 to notify the discovery module 124 that the timestamp for the SQL database 146 has changed since the previous timestamp for the SQL database 146, which was received in a discovery request.

Following receipt of a change notification for an application's resource, an identifier of the application resource is optionally requested from the application's host, block 306. A backup server can request an application host to provide information for a newly discovered application resource. In embodiments, this can include the discovery module 124 making a REST application programming interface call to the application host agent-services 132 to request information about a newly discovered application resource, such as the SQL database 146.

An identifier of an application's resource is input from the application's host, block 308. A backup server inputs information for a discovered application resource. For example, and without limitation, this can include the discovery module 124 receiving a REST application programming interface call from the application host agent-services 132 that provides an identifier of the SQL database 146 and its associated snapshot capable tag.

Having input an identifier of an application's resource, a determination is made whether the identifier of the application resource was input with any associated snapshot capable tag, block 310. A backup server determines whether any application resource identifiers that were input were tagged with snapshot capable tags. By way of example and without limitation, this can include the discovery module 124 determining whether the identifier of the SQL database 146 was input with an associated snapshot capable tag. If the identifier of the application resource was input with any associated snapshot capable tag, then the method 300 continues to block 312 to determine if the application resource satisfies any snapshot policy rules. If the identifier of the application resource was not input with any associated snapshot capable tag, then the method 300 terminates.

If the identifier of the application resource was input with any associated snapshot capable tag, then a determination is made whether the application resource satisfies any of the snapshot policy rules, block 312. A backup server determines whether a snapshot capable application resource satisfies any snapshot policy rule. In embodiments, this can include the discovery module 124 determining whether the SQL database 146 satisfies any of the snapshot policy rules 126. If the application resource satisfies a snapshot policy rule, then the method 300 continues to block 314 to identify the data protection policy that corresponds to the snapshot policy rule. If the application resource does not satisfy a snapshot policy rule, then the method 300 terminates.

If the application resource satisfies a snapshot policy rule, then a data protection policy is identified as associated with the snapshot policy rule, block 314. A backup server identifies the data protection policy that corresponds to the snapshot policy rule satisfied by the application resource. For example, and without limitation, this can include the discovery module 124 determining that the SQL database 146 satisfies one of the snapshot policy rules 126 that corresponds to a SQL data protection policy which requires hourly snapshots of the SQL database 146.

After a data protection policy is identified, a request is output for an application host to create, based on the identified data protection policy, a snapshot of an application resource that was input with an associated snapshot capable tag, block 316. A backup server requests an application host to create a snapshot of a snapshot-capable application resource based on the identified data protection policy. By way of example and without limitation, this can include the application data manager 122 making a REST application programming interface call to the application host agent-services 132 to create a snapshot of the SQL database 146.

Following the output of the request for the application host to create a snapshot of the application resource, a request is optionally output for the application host to output a copy of the snapshot of the application resource and delete the snapshot of the application resource, block 318. A backup server can request an application host to move a short-term retention snapshot to the backup server for long-term retention. In embodiments, this can include the application data manager 122 making a REST application programming interface call to the application host agent-services 132 to move the snapshot of the SQL database 146 from the host snapshots 176.

Having output a request for the application host to move the snapshot of the application resource, a copy is optionally input of the snapshot of the application resource, block 320. A backup server can receive a short-term retention snapshot to store for long-term retention. For example, and without limitation, this can include application data manager 122 receiving the snapshot of the SQL database 146 from the host snapshots 176 via the application host agent-services 132.

After inputting a copy of the snapshot of the application resource, the copy of the snapshot of the application resource is optionally stored, block 322. A backup server can store a snapshot for long-term retention. By way of example and without limitation, this can include the application data manager 122 storing the snapshot of the SQL database 146 in the 1st disk snapshots 182.

Although FIG. 3 depicts the blocks 302-322 occurring in a specific order, the blocks 302-322 may occur in another order. In other implementations, each of the blocks 302-322 may also be executed in combination with other blocks and/or some blocks may be divided into a different set of blocks.

Figure 4:
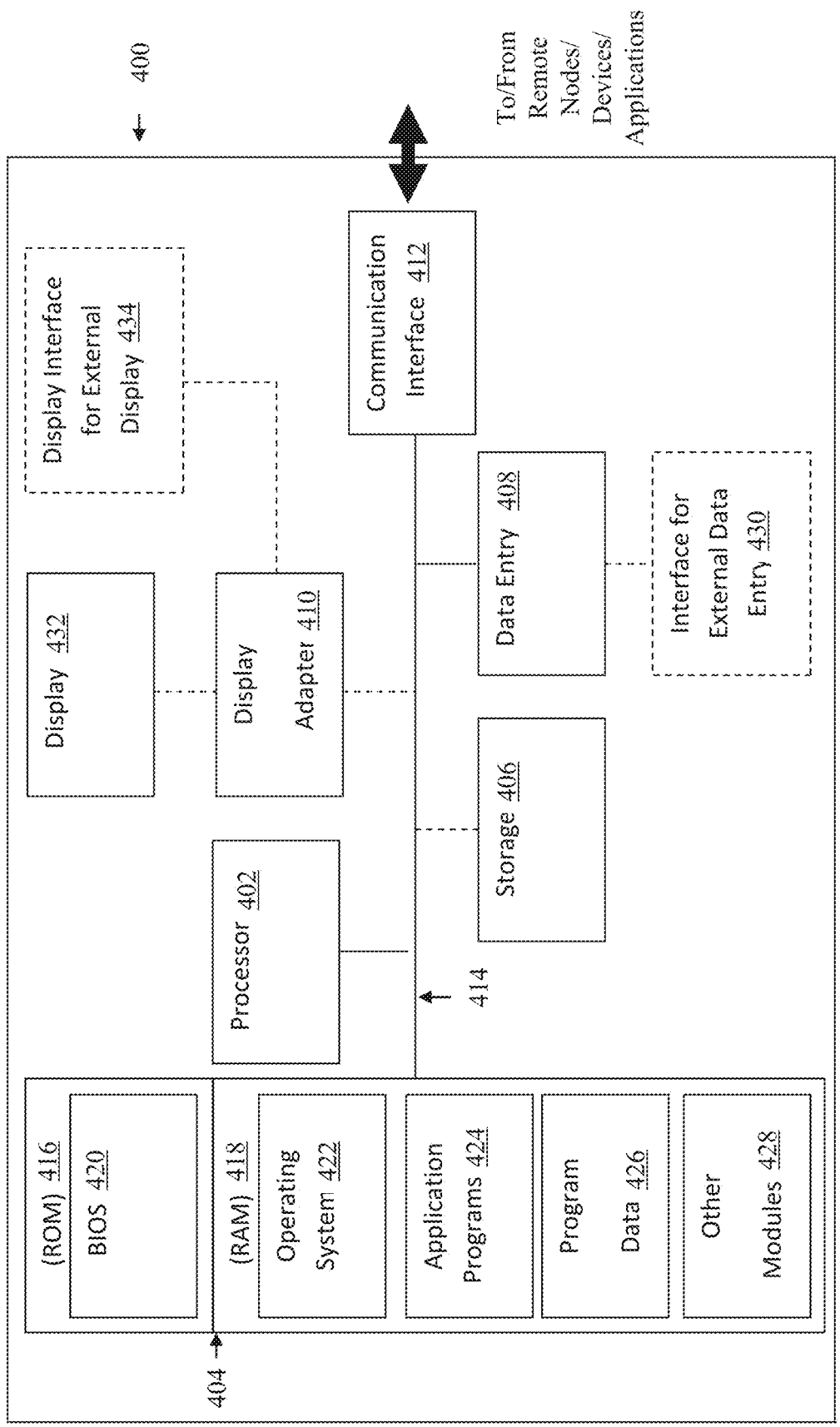
FIG. 4 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for tagging application resources for snapshot capability-aware discovery, comprising:
   one or more processors; and
   a non-transitory computer readable medium storing a plurality of instructions, which when executed, cause the one or more processors to:
   determine, by an application host, whether an application resource, of a plurality of application resources associated with an application that is hosted by the application host, satisfies any of a set of snapshot capability rules, each snapshot capability rule setting a prerequisite based on performance of the application resource for creating a snapshot of the application resource;
   associate, by the application host, the application resource with a snapshot capable tag, in response to a determination that the application resource satisfies any of the set of snapshot capability rules; and
   output, by the application host, an identifier of the application resource and any associated snapshot capable tag, to a backup server; and
   create by the application host, a snapshot of the application resource associated with any snapshot capable tag, in response to inputting a request to create the snapshot of the application resource associated with any snapshot capable tag, from the backup server.

2. The system of claim 1, wherein the plurality of instructions further causes the processor to:
   input, by the application host, a discovery request associated with the application resource, from the backup server;
   output, by the application host, a change notification for the application resource, to the backup server; and
   input, by the application host, a request for the identifier of the application resource, from the backup server.

3. The system of claim 2, wherein the discovery request comprises a timestamp corresponding to a previous version of the application resource, and inputting the discovery request comprises creating a subscription from the backup server, thereby restricting the outputting of any change notification for the application resource to outputting a change notification for a current version of the application resource which corresponds to an updated timestamp.

4. The system of claim 3, wherein the plurality of instructions further causes the processor to output, by the application host, a copy of the snapshot of the application resource and delete the snapshot of the application resource, in response to inputting a request to output the copy of the snapshot of the application resource and delete the snapshot of the application resource, from the backup server.

5. The system of claim 1, wherein the plurality of resources comprises at least one of an application host configuration, a file system, any application, a database, and copy metadata of a backup copy associated with the database.

6. The system of claim 1, wherein the set of snapshot capability rules comprises at least one of a first snapshot capability rule and a second snapshot capability rule, the application resource satisfying any of the set of snapshot capability rules comprises one of the application resource satisfying at least one of the first snapshot capability rule and the second snapshot capability rule, and the application resource satisfying both the first snapshot capability rule and the second snapshot capability rule.

7. The system of claim 1, wherein the set of snapshot capability rules specify at least one of a size of storage that stores the application resource, a type of storage that stores the application resource, a computing resource utilization associated with the application host, a communication rate associated with the application host, a changed part of the application resource relative to an unchanged part of the application resource; a name associated with the application host, an internet protocol range associated with the application host, and a vendor associated with the application.

8. A computer-implemented method for tagging application resources for snapshot capability-aware discovery, the computer-implemented method comprising:

determining, by an application host, whether an application resource, of a plurality of application resources associated with an application that is hosted by the application host, satisfies any of a set of snapshot capability rules, each snapshot capability rule setting a prerequisite based on performance of the application resource for creating a snapshot of the application resource;

associating, by the application host, the application resource with a snapshot capable tag, in response to a determination that the application resource satisfies any of the set of snapshot capability rules; and outputting, by the application host, an identifier of the application resource and any associated snapshot capable tag, to a backup server; and create by the application host, a snapshot of the application resource associated with any snapshot capable tag, in response to inputting a request to create the snapshot of the application resource associated with any snapshot capable tag, from the backup server.

9. The computer-implemented method of claim 8, wherein the computer-implemented method further comprises:

inputting, by the application host, a discovery request associated with the application resource, from the backup server;

outputting, by the application host, a change notification for the application resource, to the backup server; and inputting, by the application host, a request for the identifier of the application resource, from the backup server.

10. The computer-implemented method of claim 9, wherein the discovery request comprises a timestamp corresponding to a previous version of the application resource, and inputting the discovery request comprises creating a subscription from the backup server, thereby restricting the outputting of any change notification for the application resource to outputting a change notification for a current version of the application resource which corresponds to an updated timestamp.

11. The computer-implemented method of claim 10, wherein the computer-implemented method further comprises outputting, by the application host, a copy of the snapshot of the application resource and delete the snapshot of the application resource, in response to inputting a request to output the copy of the snapshot of the application resource and delete the snapshot of the application resource, from the backup server.

12. The computer-implemented method of claim 8, wherein the plurality of resources comprises at least one of an application host configuration, a file system, any application, a database, and copy metadata of a backup copy associated with the database.

13. The computer-implemented method of claim 8, wherein the set of snapshot capability rules comprises at least one of a first snapshot capability rule and a second snapshot capability rule, the application resource satisfying any of the set of snapshot capability rules comprises one of the application resource satisfying at least one of the first snapshot capability rule and the second snapshot capability rule, and the application resource satisfying both the first snapshot capability rule and the second snapshot capability rule.

14. The computer-implemented method of claim 8, wherein the set of snapshot capability rules specify at least one of a size of storage that stores the application resource, a type of storage that stores the application resource, a computing resource utilization associated with the application host, a communication rate associated with the application host, a changed part of the application resource relative to an unchanged part of the application resource; a name associated with the application host, an internet protocol range associated with the application host, and a vendor associated with the application.

15. A computer program product, comprising a non-transitory computer-readable medium having a computer-readable program code embodied therein to be executed by one or more processors, the program code including instructions to:

determine, by an application host, whether an application resource, of a plurality of application resources associated with an application that is hosted by the application host, satisfies any of a set of snapshot capability rules, each snapshot capability rule setting a prerequisite based on performance of the application resource for creating a snapshot of the application resource;

associate, by the application host, the application resource with a snapshot capable tag, in response to a determination that the application resource satisfies any of the set of snapshot capability rules; and output, by the application host, an identifier of the application resource and any associated snapshot capable tag, to a backup server; and create by the application host, a snapshot of the application resource associated with any snapshot capable tag, in response to inputting a request to create the snapshot of the application resource associated with any snapshot capable tag, from the backup server.

16. The computer program product of claim 15, wherein the program code includes further instructions to:

input, by the application host, a discovery request associated with the application resource, from the backup server;

output, by the application host, a change notification for the application resource, to the backup server; and input, by the application host, a request for the identifier of the application resource, from the backup server.

17. The computer program product of claim 16, wherein the discovery request comprises a timestamp corresponding to a previous version of the application resource, and inputting the discovery request comprises creating a subscription from the backup server, thereby restricting the outputting of any change notification for the application resource to outputting a change notification for a current version of the application resource which corresponds to an updated timestamp.

18. The computer program product of claim 17, wherein the program code includes further instructions to output, by the application host, a copy of the snapshot of the application resource and delete the snapshot of the application resource, in response to inputting a request to output the copy of the snapshot of the application resource and delete the snapshot of the application resource, from the backup server.

19. The computer program product of claim 15, wherein the plurality of resources comprises at least one of an application host configuration, a file system, any application, a database, and copy metadata of a backup copy associated with the database.

20. The computer program product of claim 15, wherein the set of snapshot capability rules comprises at least one of a first snapshot capability rule and a second snapshot capability rule, the application resource satisfying any of the set of snapshot capability rules comprises one of the application resource satisfying at least one of the first snapshot capability rule and the second snapshot capability rule, and the application resource satisfying both the first snapshot capability rule and the second snapshot capability rule, and the set of snapshot capability rules specify at least one of a size of storage that stores the application resource, a type of storage that stores the application resource, a computing resource utilization associated with the application host, a communication rate associated with the application host, a changed part of the application resource relative to an unchanged part of the application resource; a name associated with the application host, an internet protocol range associated with the application host, and a vendor associated with the application.

* * * * *